(12) United States Patent
Kawabata

(10) Patent No.: US 6,681,368 B1
(45) Date of Patent: Jan. 20, 2004

(54) FILE MANAGEMENT METHOD, FILE DISPLAY METHOD, AND FILE STORAGE MEDIUM THAT ENABLES DISPLAY OF AN INDEX FILE HAVING A FRAME STRUCTURE BY BOTH BROWSERS THAT SUPPORT AND BROWSERS THAT DO NOT SUPPORT FRAME FUNCTIONALITY

(75) Inventor: Ichiro Kawabata, Kawasaki (JP)

(73) Assignee: Fujitsu Limited, Kawasaki (JP)

( * ) Notice: Subject to any disclaimer, the term of this patent is extended or adjusted under 35 U.S.C. 154(b) by 0 days.

(21) Appl. No.: 09/225,325

(22) Filed: Jan. 5, 1999

(30) Foreign Application Priority Data

Jul. 16, 1998  (JP) .......................................... 10-202228

(51) Int. Cl.7 ............................................. G06F 17/21
(52) U.S. Cl. ..................................... 715/501.1; 715/513
(58) Field of Search ................................ 707/513, 522, 707/523, 524; 345/780, 750; 715/513, 522, 523, 524, 501.1

(56) References Cited

U.S. PATENT DOCUMENTS

| | | | | |
|---|---|---|---|---|
| 5,778,372 A | * | 7/1998 | Cordell et al. ............... | 707/513 |
| 5,835,914 A | * | 11/1998 | Brim ........................... | 707/513 |
| 5,890,171 A | * | 3/1999 | Blumer et al. ............... | 707/513 |
| 5,987,482 A | * | 11/1999 | Bates et al. .................. | 707/513 |
| 6,009,429 A | * | 12/1999 | Greer et al. ................. | 707/513 |
| 6,016,494 A | * | 1/2000 | Isensee et al. ............... | 707/513 |
| 6,061,700 A | * | 5/2000 | Brobst et al. ................ | 707/523 |
| 6,081,263 A | * | 6/2000 | LeGall et al. ................ | 345/760 |
| 6,112,242 A | * | 8/2000 | Jois et al. .................... | 709/225 |
| 6,151,596 A | * | 11/2000 | Hosomi ....................... | 707/522 |
| 6,178,433 B1 | * | 1/2001 | Nakamura et al. .......... | 707/513 |
| 6,182,072 B1 | * | 1/2001 | Leak et al. .................. | 707/513 |
| 6,199,082 B1 | * | 3/2001 | Ferrel et al. ................. | 707/522 |
| 6,226,642 B1 | * | 5/2001 | Beranek et al. .............. | 707/513 |
| 6,249,787 B1 | * | 6/2001 | Schleimer et al. ........... | 707/513 |
| 6,256,622 B1 | * | 7/2001 | Howard et al. .............. | 707/513 |
| 6,266,684 B1 | * | 7/2001 | Kraus et al. ................. | 707/513 |
| 6,282,548 B1 | * | 8/2001 | Burner et al. ................ | 707/513 |
| 6,297,819 B1 | * | 10/2001 | Furst ........................... | 707/513 |
| 6,300,947 B1 | * | 10/2001 | Kanevsky .................... | 707/513 |
| 6,301,590 B1 | * | 10/2001 | Siow et al. ................... | 707/513 |
| 6,311,196 B1 | * | 10/2001 | Arora et al. ................. | 707/513 |
| 6,314,424 B1 | * | 11/2001 | Kaczmarski et al. ........ | 707/513 |

OTHER PUBLICATIONS

Silverman, P., "HoTMetal PRO 3.0—Add Power to Web Pages", Windows Magazine, No. 709, pa. 111(reprinted), Sep. 1996.*
Faison, T., "The New HTML Help System Extends Online Help from the Desktop to the Web", Microsoft Systems Journal, v. 13, n. 1, pp. 55(14)(reprinted), Jan. 1998.*
Finnie, S. "Framing Your Web Site", Windows Sources, v. 4, n. 9, p. 237 (2)(reprinted), Sep. 1996.*

\* cited by examiner

Primary Examiner—Stephen S. Hong
(74) Attorney, Agent, or Firm—Staas & Halsey LLP

(57) ABSTRACT

A file management method is used to display an index file having a frame structure made up of a plurality of windows by a browser which does not support a frame function. The file management method includes the steps of specifying, as a base target, at least one specific window within the index file, and including contents of the specific window in a non-frame tag part of the index file, so as to eliminate the need to manage two kinds of files and to simplify the file management.

18 Claims, 25 Drawing Sheets

FIG. 2

```
                              index.html
<html>
<head><title> PRESENT INVENTION </title></head>
<frameset cols="180,border="0">
<frameset rows="45,*">
<frame src="window0.html" name="window0">
<frame src="window1.html" name="window1" >
</frameset>
<frameset rows="45,*">
<frame src="window2.html" name="window2">
<frame src="window3.html" name="window3">
</frameset>
<noframes>
<TABLE border=0 WIDTH="800"><TR>
<TD>
<UL>
<LI><A HREF="test.html"> PRESENT INVENTION </A>
</UL>

</TD>
</TR></TABLE>
</noframes>
</html>
```

500 — (frameset section)

501 — (noframes section) — NEWLY CREATE IDENTICAL CONTENT TO COPE WITH NON-FRAME

```
       Window0-2.html
<html>
<head>
<title> PRESENT INVENTION</title>
<base target="window3">
</head>
```

FIG. 6

```
                                index.html
<html>
<head><title> PRESENT INVENTION </title></head>
<frameset cols="180,border="0">
<frameset rows="45,*">
<frame src="window0.html" name="window0">
<frame src="window1.html" name="window1" >
</frameset>
<frameset rows="45,*">
<frame src="window2.html" name="window2">
<frame src="window3.html" name="window3">
</frameset>
<noframes>
<!--#include file="window3.html" -->
</noframes>
</html>
```

FIG. 9

```
Window0-2.html
<html>
<head>
<title> PRESENT INVENTION </title>
<base target="window3">
</head>

</html>
```

FIG. 11 index.html

```
<html>
<head>
<title> PRESENT INVENTION</title>
<SCRIPTLANGUAGE='JavaScript' SRC="cut.js">
</SCRIPT>
</head>
<frameset cols="180.border="0">
<frameset rows="45.*">
<frame src="window0.html" name="window0">
<frame src="window 1.html" name="window1">
</frameset>
<frameset rows="45,*">
<frame src="window2.html" name="window2">
<frame src="window3.html" name="window3">
</frameset>
<noframes>

<TABLE border=0 WIDTH="800"><TR>
<!--#include file="window0c.html"-->
<!--#include file="window2c.html"-->
</TR></TABLE>

<TABLE border=0 WIDTH="800"><TR>
<!--#include file="window1c.html"-->
<!--#include file="window3c.html"-->
</TR></TABLE>

</noframes>
</html>
```

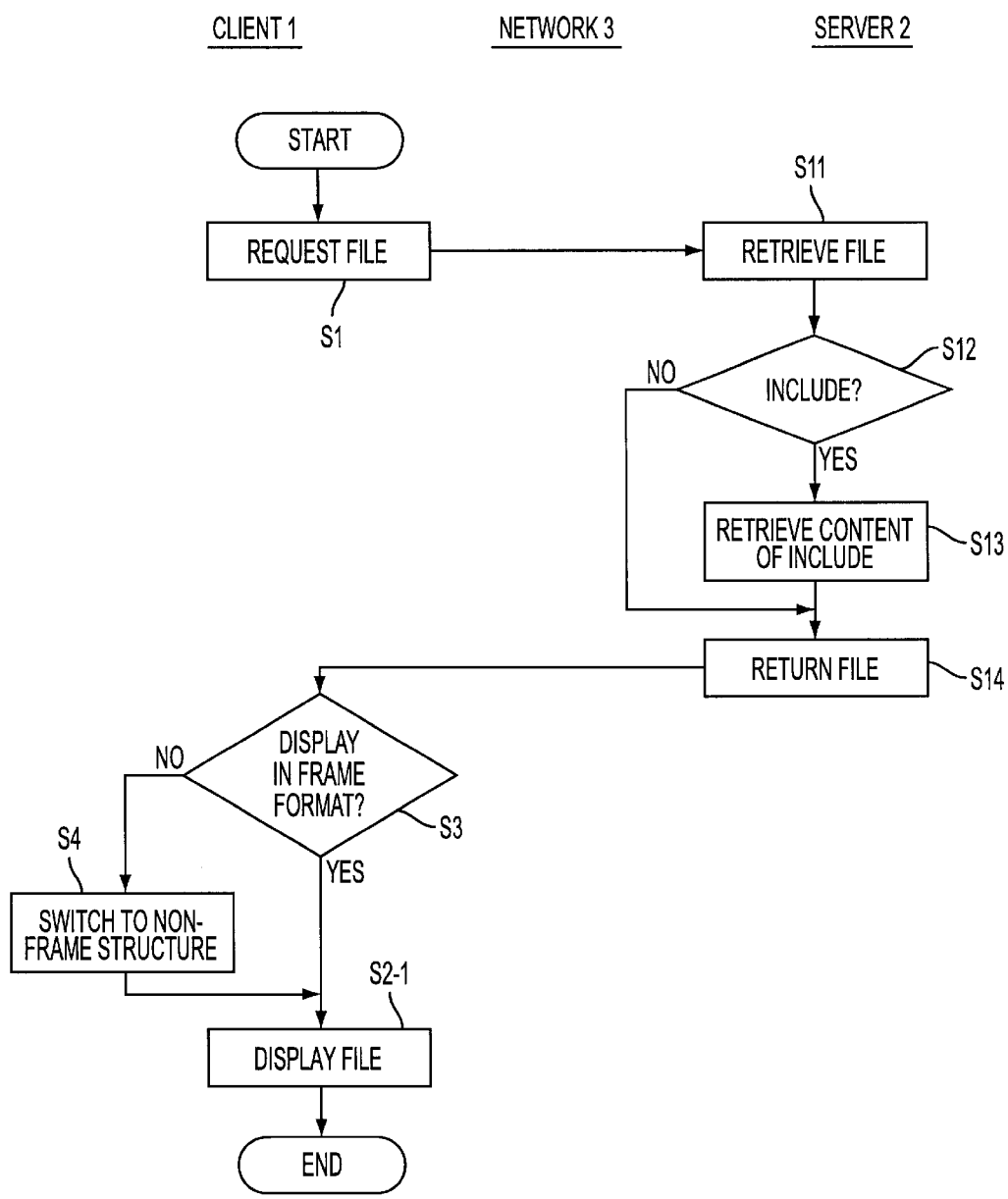

FIG. 16 window0.html

```
<html>
<head><title> CONVENIENCE </title></head>
<body BGCOLOR="#eeeeee">
<BR>
<CENTER>
<a href="http://www.cs.fujitsu.co.jp/jki/info.html" target="window3"><IMG ALIGN=MIDDLE SRC="../image/jki/jki_logo2.gif" border=0></a>
</CENTER>
</body>
</html>
```

FIG. 17

<u>window1.html</u>

```html
<html>
<head>
<base target="window3">
<title>CONVENIENCE</title>
</head>
<body BGCOLOR="#eeeeee">
<table border=2 cellpadding=0 cellspacing=0 bgcolor=#ffcccc width=170>
<tr valign=middle><td><img src="../jki_image/is07r.gif" border=0><a href="conv/top97.html" target="window3"> TOPICS </a></td></tr><!br>
</table><!br>
<table border=2 cellpadding=0 cellspacing=0 bgcolor=#eeeeee width=170>
<tr valign=middle><td><img src="../jki_image/is07b.gif" border=0><a href="conv/index.html#conv1" target="window3"><!font color="#ffffff"> CONVENIENCE <!/font></a></td></tr>
</table>
</body>
</html>
```

FIG. 18 window2.html

```
<html>
<head><title> CONVENIENCE </title></head>
<script language="javaScript">
<!-- Hide The SCRIPT From Other Browsers
if (navigator.appName == "Netscape" && parseInt(navigator.appVersion) >= 3) {
     rollOvers = 1;
} else {
     rollOvers = 0;
}
loaded = 0
var dirLevel = 0;
var levelMod = "";
levelMod = "";
for (i = 0;i < dirLevel;i++) {
        levelMod += "../";
}
function loadImg () {
    if (rollOvers) {
        whaOn = new Image(36, 66);
        whaOn.src = levelMod + "../jki_image/m_wha_on_r.gif";
        whaOff = new Image(36, 66);
        whaOff.src = levelMod + "../jki_image/m_wha_of_r.gif";

cnvOn = new Image(36, 66);
        cnvOn.src = levelMod + "../jki_image/m_cnv_on1.gif";
        cnvOff = new Image(36, 66);
        cnvOff.src = levelMod + "../jki_image/m_cnv_on1.gif";
        loaded = 1
    }
}
function switchOn(imgName) {
        if (loaded == 1) {
        imgOn = eval(imgName + "On.src");
        document [imgName].src = imgOn;
```

FIG. 19

```
        }
    } function switchOff(imgName) {
        if (loaded == 1) {
            imgOff = eval(imgName + "Off.src");
            document [imgName].src = imgOff;
        }
    }
// Stop Hiding From Other Browsers -->

</script>
</HEAD>
<!body background="backgr_1.gif">
<body BGCOLOR="#ffffff">
<BODY bgcolor="#ffffff" text="#ffffff" onLoad = "loadImg()">

<CENTER><BR>
<TABLE border=0 cellspacing=0 cellpadding=0 width="320">
<TR><TD>
<A href="../jki_hot/index.html" target="_top" onMouseover="switchOn('wha')"
onMouseout="switchOff('wha')"><IMG src="../jki_image/m_wha_of_r.gif" width="66"
height="36" border="0" name="wha" alt="What's New"></A><A
href="../jki_conv/index.html" target="_top" onMouseover="switchOn('cnv')"
onMouseout="switchOff('cnv')"><IMG src="../jki_image/m_cnv_on1.gif" width="66"
height="36" border="0" name="cnv" alt="convenience"></A>
    </TD>
    <TD><A HREF="../main_s.map"><IMG SRC="../image/jki/main_s.gif" ISMAP
BORDER="0" usemap="#main_s"></TD>
</TR>
</TABLE>
</CENTER>
</BODY>
</HTML>
```

FIG. 20 window3.html

```html
<HTML>
<HEAD>
<TITLE>CONVENIENCE (JKI INFOTOWER)</TITLE>
</HEAD>
<BODY BGCOLOR="#ffffff">
<a name="conv1"></a>
<center>
<A HREF="http://kawabata.cae.cs.fujitsu.co.jp/jki_hot/index.html" target="_top">WHAT'S NEW INFO (menu1)</A>、
<A HREF="http:///" target="_top"> CONVENIENCE (menu2)</A><BR>
</center>
<center>
<table border=2 cellpadding=0 cellspacing=0 bgcolor=#ffcccc width=200>
<tr valign=middle align=center><td><!img src="" border=0><!a href="" target="window3">CONVENIENCE<!/a></td></tr><br>
</table>
</center><br>
<!center><!img src="../../jki_image/DOT.GIF" width=500 height=1 border=0 alt="h line"><!/center>
<center>
<TABLE border=0 cellpadding="0" cellspacing="0">
<TR valign="middle">
<TD VALIGN="TOP" colspan=15>
<TD VALIGN=TOP>
<table border=0 cellpadding=0 cellspacing=0 bgcolor=#ccccff width=100%>
<tr valign=middle align=center><td><!img src="" border=0><!a href="" target="window3"><B> CONVENIENT SITE</B><!/a></td></tr>
</table><br>
<IMG SRC="../../image/balls/ma.gif">COMPANY DIRECTORY
<UL>
<LI><A HREF="http://www.pr.hq.fujitsu.co.jp/" target="top"> P. R. DEPT. (MAIN OFFICE INFO CENTER)</A>
<LI><A HREF="http://fjidtel.nic.fujitsu.co.jp/" target="top"> TEL. NO., ID INFO RETRIEVAL・UPDATE SYSTEM </A>
```

FIG. 21

```
</UL>
<TD VALIGN="TOP" colspan=15>
<center><img src="../../jki_image/DOT.GIF" width=1 height=100 border=0 alt="v line"></center>
<TD VALIGN="TOP">
<table border=0 cellpadding=0 cellspacing=0 bgcolor=#ccccff width=100%>
<tr valign=middle align=center><td><!img src="" border=0><!a href="" target="window3"><B>WWW Search Engine</B><!/a></td></tr>
</table><br>
<UL>
<LI> IN COMPANY
<UL>
<LI><A HREF="http://navi.nic.fujitsu.co.jp/" target="top">FNET Navigator</A>
<LI><A HREF="http://www.nic.fujitsu.co.jp:8000/ftpsearch" target="top">FTP SERVER RETRIEVAL SERVICE</A>
</UL><BR>
</UL>
</TD></TR>
</TABLE>
<center>
<img src="../../image/jki/end.gif" border="0"><font size="3" color="#00A0DD"></font>
<TABLE COLSPEC="L20 L20">
<TR><TD><A HREF="mailto:miaki@cs.fujitsu.co.jp">
<IMG ALIGN="ABSMIDDLE" SRC="../../image/mailme2.gif" BORDER="0">E-Mail</A></TD><TD><!ADDRESS>Last <A HREF="../../jki_webm/index.html" target=_top>Modified : </a><!--#echo var="LAST_MODIFIED" --><br>1997 Copyright(c) Fujitsu<BR>miaki@cs.fujitsu.co.jp<!/ADDRESS></TD>
<TD><A HREF="../main_s.map"><IMG ALIGN="MIDDLE" SRC="../../image/jki/main_s.gif" ISMAP BORDER="0" usemap="#main_s"></A></TD></TR>
</TABLE>
<img src="../../image/jki/separate.gif" border="0">
</center>
</BODY>
</HTML>
```

FIG. 22 index.html

```
<html>
<head>
<title>Department</title>
<meta name="title" content="conv">
</head>
<frameset    cols="180,*"    frameborder="0"    framespacing="0"    border="0"
bordercolor="#808080">
        <frameset rows="70,*">
            <frame    src="window0.html"    name="window0"    scrolling="no"
marginwidth="1" marginheight="1">
            <frame    src="window1.html"    name="window1"    scrolling="auto"
marginwidth="1" marginheight="1">
        </frameset>
        <frameset rows="70,*">
            <frame    src="window2.html"    name="window2"    scrolling="no"
marginwidth="1" marginheight="1">
            <frame   src="conv/index.html"   name="window3"   scrolling="auto"
marginwidth="1" marginheight="1">
        </frameset>
</frameset>
<noframes>
<body BGCOLOR="#ffffff">
<center>
THIS PAGE CAN BE SEEN BY BROWSER WITH FRAME FUNCTION (Netscape 2.0 ONWARD)
</center>
<HTML>
<HEAD>
<TITLE> CONVENIENCE (JKI INFOTOWER)</TITLE>
</HEAD>
<BODY BGCOLOR="#ffffff">
<a name="conv1"></a>
<center>
<A HREF="http://kawabata.cae.cs.fujitsu.co.jp/jki_hot/index.html" target="_top"> WHAT'S NEW INFO
(menu1)</A>.
<A HREF="http:///" target="_top"> CONVENIENCE (menu2)</A><BR>
```

FIG. 23

```
</center>
<center>
<table border=2 cellpadding=0 cellspacing=0 bgcolor=#ffcccc width=200>
<tr valign=middle align=center><td><!img src="" border=0><!a href=""
target="window3">CONVENIENCE <!/a></td></tr><br>
</table>
</center><br>
<!center><!img src="./../jki_image/DOT.GIF" width=500 height=1 border=0 alt="h
line"><!/center>
<center>
<TABLE border=0 cellpadding="0" cellspacing="0">
<TR valign="middle">
<TD VALIGN="TOP" colspan=15>
<TD VALIGN=TOP>
<table border=0 cellpadding=0 cellspacing=0 bgcolor=#ccccff width=100%>
<tr valign=middle align=center><td><!img src="" border=0><!a href=""
target="window3"><B>CONVENIENT SITE</B><!/a></td></tr>
</table><br>
<IMG SRC="./../image/balls/ma.gif"> COMPANY DIRECTORY
<UL>
<LI><A HREF="http://www.pr.hq.fujitsu.co.jp/" target="top"> P. R. DEPT. (MAIN OFFICE INFO
CENTER) </A>
<LI><A HREF="http://fjidtel.nic.fujitsu.co.jp/" target="top"> TEL. NO., ID INFO RETRIEVAL ·
UPDATE SYSTEM </A>
</UL>
<TD VALIGN="TOP" colspan=15>
<center><img src="./../jki_image/DOT.GIF" width=1 height=100 border=0 alt="v
line"></center>
<TD VALIGN="TOP">
<table border=0 cellpadding=0 cellspacing=0 bgcolor=#ccccff width=100%>
<tr valign=middle align=center><td><!img src="" border=0><!a href=""
target="window3"><B>WWW Search Engine</B><!/a></td></tr>
</table><br>
<UL>
<LI>社内
<UL>
<LI><A HREF="http://navi.nic.fujitsu.co.jp/" target="top">FNET Navigator</A>
```

FIG. 24

```
<LI><A HREF="http://www.nic.fujitsu.co.jp:8000/ftpsearch" target="top">FTP SERVER
RETRIEVAL SERVICE </A>
</UL><BR>
</UL>
</TD></TR>
</TABLE>
<center>
<img src="../../image/jki/end.gif" border="0"><font size="3" color="#00A0DD"></font>
<TABLE COLSPEC="L20 L20">
<TR><TD><A HREF="mailto:miaki@cs.fujitsu.co.jp">
<IMG ALIGN="ABSMIDDLE" SRC="../../image/mailme2.gif" BORDER="0">E-
Mail</A></TD><TD><!ADDRESS>Last    <A    HREF="../../jki_webm/index.html"
target=_top>Modified  :  </a>Tuesday,  19-May-98  <br>1997  Copyright(c)
Fujitsu<BR>miaki@cs.fujitsu.co.jp<!/ADDRESS></TD>
<TD><A           HREF="../main_s.map"><IMG           ALIGN="MIDDLE"
SRC="../../image/jki/main_s.gif"         ISMAP         BORDER="0"
usemap="#main_s"></A></TD></TR>
</TABLE>
<img src="../../image/jki/separate.gif" border="0">
</center>
</BODY>
</HTML>
<P>
</body>
</noframes>
</html>
```

FILE MANAGEMENT METHOD, FILE DISPLAY METHOD, AND FILE STORAGE MEDIUM THAT ENABLES DISPLAY OF AN INDEX FILE HAVING A FRAME STRUCTURE BY BOTH BROWSERS THAT SUPPORT AND BROWSERS THAT DO NOT SUPPORT FRAME FUNCTIONALITY

BACKGROUND OF THE INVENTION

The present invention generally relates to file management methods, file display methods and storage mediums, and more particularly to a file management method and a file display method which make a browser display a file having a frame structure made up of a plurality of windows, and to a computer-readable storage medium which stores a program for causing a computer to display a file by such a file management method or a file display method.

By requesting a file from a client by a uniform resource locator (URL) to a web (WWW) server which is connected to the internet, it is possible to display a desired file by browsing. In other words, it is possible to read a home page and to display the home page at the client, and such an operation is frequently performed. The browser which is used for the browsing may support a frame function or may not support the frame function.

The browser which supports the frame function can read and display a file having a frame structure made up of a plurality of windows. On the other hand, the browser which does not support the frame function can read and display a file having a non-frame structure, but cannot read and display a file having the frame structure.

Accordingly, at the server which provides the home page, it is necessary to prepare a file having the frame structure and a file having the non-frame structure, so that the home page can be read by the browser having the frame function and by the browser which does not support the frame function.

FIGS. 1A and 1B are diagrams for explaining conventional file structures. FIG. 1A shows a file having the frame structure, and FIG. 1B shows a file having the non-frame structure. In FIG. 1A, the file having the frame structure is divided into four windows window0 through window3 having the following structure. In the description given hereinafter, "index.html" indicates an index file which sets the frame structure and specifies the non-frame.

| | |
|---|---|
| window0.html[window0]: | Logo mark image |
| window1.html[window0]: | Table of contents of each main menu |
| window2.html[window2]: | Main menu |
| window3.html[window3]: | Content of each table of contents |

Conventionally, a hyper text markup language (HTML) file having the frame structure is created, and a HTML file having the non-frame structure is newly created in addition although the contents are the same as those of the HTML file having the frame structure. For example, the main menu and the content of each table of contents, that is, the main menu and the content of each table of contents with the same contents as those of the HTML file having the frame structure are newly created in a non-frame tag part in addition to window2.html and window3.html described above.

FIG. 2 is a diagram showing a list of a conventional index file index.html with respect to the file structures shown in FIGS. 1A and 1B. In FIG. 2, a list part 500 defines the HTML file having the frame structure shown in FIG. 1A, and a list part 501 defines the HTML file having the non-frame structure shown in FIG. 1B. As shown in FIG. 2, in the non-frame tag part of the list part. 501, the main menu and the content of each table of contents of the HTML file having the frame structure, that is, the main menu and the content of each table of contents with the same contents as those of the HTML file having the frame structure, are newly created in addition to window2.html and window3.html described above.

Therefore, in order to enable reading of the home page by both the browser which supports the frame function and the browser which does not support the frame function, the same main menu and the same table of contents must be created separately for the HTML file having the frame structure and the HTML file having the non-frame structure. As a result, it is necessary to manage two kinds of HTML files with the same menu and the same table of contents, and there was a problem in that the file management is complex.

On the other hand, when creating the same main menu and the same table of contents independently with respect to the HTML file having the frame structure and the HTML file having the non-frame structure, it is necessary to correct an error if an error is generated in one of the HTML file having the frame structure and the HTML file having the non-frame structure. However, when the error is not noticed or the correction of the error is incorrect, the contents of the home page become different between the HTML file having the frame structure and the HTML file having the non-frame structure, even though the contents of the home page must be the same. In such a case, there is a problem in that it is impossible to provide correct information of the home page to the users.

SUMMARY OF THE INVENTION

Accordingly, it is a general object of the present invention to provide a novel and useful file management method, file display method and storage medium, in which the problems described above are eliminated.

Another and more specific object of the present invention is to provide a file management method, file display method and storage medium, which can simplify the file management by eliminating the need to manage two kinds of files, and guarantee the contents of the home page to be identical regardless of whether the home page is read by a browser which supports the frame function or a browser which does not support the frame function.

Still another object of the present invention is to provide a file management method for displaying an index file having a frame structure made up of a plurality of windows by a browser which does not support a frame function, comprising the steps of (a) specifying, as a base target, at least one specific window within the index file, and (b) including contents of the specific window in a non-frame tag part of the index file. According to the file management method of the present invention, it is unnecessary to manage two kinds of files, and the file management can be simplified. In addition, it is possible to guarantee that the contents of the home page are identical regardless of whether the home page is read by a browser which supports the frame function or a browser which does not support the frame function.

A further object of the present invention is to provide a file display method for displaying an index file having a frame structure made up of a plurality of windows by a browser which does not support a frame function, wherein at least one specific window within the index file is specified as a base target, and the file display method comprises the steps of (a) reading contents of the specific window by a non-frame tag part of the index file using an include function, and displaying the contents of the specific window in a non-frame format. According to the file display method of the present invention, it is unnecessary to manage two kinds of files, and the file management can be simplified. In addition, it is possible to guarantee that the contents of the home page are identical regardless of whether the home page is read by a browser which supports the frame function or a browser which does not support the frame function.

Another object of the present invention is to provide a file display method for displaying an index file having a frame structure made up of a plurality of windows by a browser which supports a frame function, wherein at least one specific window within the index file is specified as a base target, and the file display method comprises the steps of (a) reading contents of the specific window by a non-frame tag part of the index file using an include function, and (b) arbitrary switching a display to display the contents of the specific window in a non-frame format or to display the index file in the frame format. According to the file display method of the present invention, it is possible to make the display in the non-frame format depending on the resolution, size and the like of the screen of the display unit.

Still another object of the present invention is to provide a computer-readable storage medium which stores a program for causing a computer to manage files by displaying an index file having a frame structure made up of a plurality of windows by a browser which does not support a frame function, comprising means for causing the computer to specify, as a base target, at least one specific window within the index file, and means for causing the computer to include contents of the specific window in a non-frame tag part of the index file. According to the computer-readable storage medium of the present invention, it is unnecessary to manage two kinds of files, and the file management can be simplified. In addition, it is possible to guarantee that the contents of the home page are identical regardless of whether the home page is read by a browser which supports the frame function or a browser which does not support the frame function.

A further object of the present invention is to provide a computer-readable storage medium which stores a program for causing a computer to display an index file having a frame structure made up of a plurality of windows by a browser which does not support a frame function, wherein at least one specific window within the index file is specified as a base target, the computer-readable storage medium comprising means for causing the computer to read contents of the specific window by a non-frame tag part of the index file using an include function, and display the contents of the specific window in a non-frame format. According to the computer-readable storage medium of the present invention, it is unnecessary to manage two kinds of files, and the file management can be simplified. In addition, it is possible to guarantee that the contents of the home page are identical regardless of whether the home page is read by a browser which supports the frame function or a browser which does not support the frame function.

Another object of the present invention is to provide a computer-readable storage medium which stores a program for causing a computer to display an index file having a frame structure made up of a plurality of windows by a browser which supports a frame function, wherein at least one specific window within the index file is specified as a base target, and the computer-readable storage medium comprises means for causing the computer to read contents of the specific window by a non-frame tag part of the index file using an include function, and means for causing the computer to arbitrary switch a display to display the contents of the specific window in a non-frame format or to display the index file in the frame format. According to the computer-readable storage medium of the present invention, it is possible to make the display in the non-frame format depending on the resolution, size and the like of the screen of the display unit.

Other objects and further features of the present invention will be apparent from the following detailed description when read in conjunction with the accompanying drawings.

BRIEF DESCRIPTION OF THE DRAWINGS

FIG. 2 is a diagram showing a list of a conventional index file index.html with respect to the file structures shown in FIGS. 1A and 1B;

FIG. 6 is a diagram showing file contents of index.html in the first embodiment;

FIG. 9 is a diagram showing file contents of window0.html through window2.html in the second embodiment;

FIG. 11 is a diagram showing the file contents of index.html in the second embodiment;

FIG. 12 is a flow chart for explaining a process of a third embodiment of the present invention;

FIG. 16 is a diagram showing a list of an embodiment of window0.html in each of the embodiments;

FIG. 17 is a diagram showing a list of an embodiment of window1.html in each of the embodiments;

FIG. 18 is a diagram showing a part of a list of an embodiment of window2.html in each of the embodiments;

FIG. 19 is a diagram showing a remaining part of the list of the embodiment of window2.html in each of the embodiments;

FIG. 20 is a diagram showing a list of a part of an embodiment of window3.html in each of the embodiments;

FIG. 21 is a diagram showing a list of a remaining part of the embodiment of window3.html in each of the embodiments;

FIG. 22 is a diagram showing a part of an embodiment of an index file index.html which is returned from the server to the client in each of the embodiments;

FIG. 23 is a diagram showing another part of the embodiment of the index file index.html which is returned from the server to the client in each of the embodiments;

FIG. 24 is a diagram showing a remaining part of the embodiment of the index file index.html which is returned from the server to the client in each of the embodiments;

DESCRIPTION OF THE PREFERRED EMBODIMENTS

Figure 3:
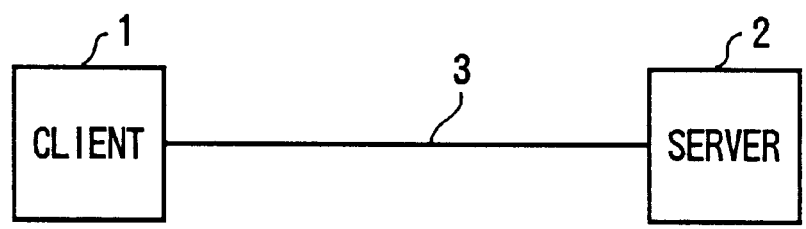
FIG. 3 is a system block diagram showing a communication system to which a file management method according to the present invention and a file display method according to the present invention may be applied.

FIG. 3 is a system block diagram showing a communication system to which a file management method according to the present invention and a file display method according to the present invention may be applied. In FIG. 3, a client 1 is made up of a known personal computer or the like comprising a display unit, a storage unit and a processor unit. This client 1 is coupled to a server 2 via a network 3. The server 2 is made up of a known computer or the like comprising a storage unit and a processor unit.

A browser for requesting a file with respect to the server 2 and displaying the file read from the server 2 is installed at the client 1. On the other hand, a web server for accepting the request from the browser, retrieving the requested tile and returning the contents of the retrieved file to the request source is installed at the server 2.

First, a description will be given of a first embodiment of a file management method according to the present invention. This first embodiment of the file management method employs a first embodiment of a file display method according to the present invention. In this embodiment, it is assumed for the sake of convenience that the file structure of the file having the frame structure is identical to that shown in FIG. 1A described above.

Figures 4, 5:
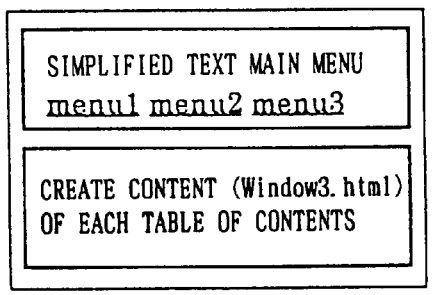
FIG. 4 is a diagram showing file contents of window3.html in a first embodiment of the present invention.
FIG. 5 is a diagram showing file contents of window0.html through window2.html in the first embodiment.

In this embodiment, a simplified text main menu shown in FIG. 4 is provided with respect to each table of contents, that is, window3.html. On the other hand, with respect to each of window0.html through window2.html, window3 is specified as a base target as shown in FIG. 5 and the target of each link part is not specified. In a non-frame tag part of the index file index.html, the content of each table of contents, that is, window3.html, is included as shown in FIG. 6.

Accordingly, when a file is requested with respect to the server 2 by URL, for example, in a case where the browser installed at the client 1 does not support the frame function, the server 2 returns the index file index.html of the specified URL to the client 1 via the network 3. In this case, if an include statement <!—#include . . . > is written in the index file index.html, the index file index.html is returned to the client 1 at the request source by including a file specified by the include statement. In this particular embodiment, the content of each table of contents, that is, window3.html, is specified by the include statement. Hence, the server 2 returns the index file index.html to the client 1 at the request source by including in the index file index.html each table of contents including the simplified text main menu shown in FIG. 4 and window0.html through window2.html shown in FIG. 5.

In the client 1 at the request source, the index file index.html returned from the server 2 is displayed on the display unit. In this case, the content of each table of contents including the simplified text main menu included in the non-frame tag part of the index file index.html, that is, the content of window3.html between <noframes> and </noframes>, is displayed in the non-frame format.

According to this embodiment, the window3.html shown in FIG. 4 provided with the simplified text main menu is created. Hence, it is unnecessary to create the same main menu and the same table of contents independently with respect to the HTML file having the frame structure and the HTML file having the non-frame structure, in order to enable reading of the home page by both the browser which supports the frame function and the browser which does not support the frame function. As a result, there is no need to manage two kinds of HTML files, and the file management is simplified.

Figure 7:
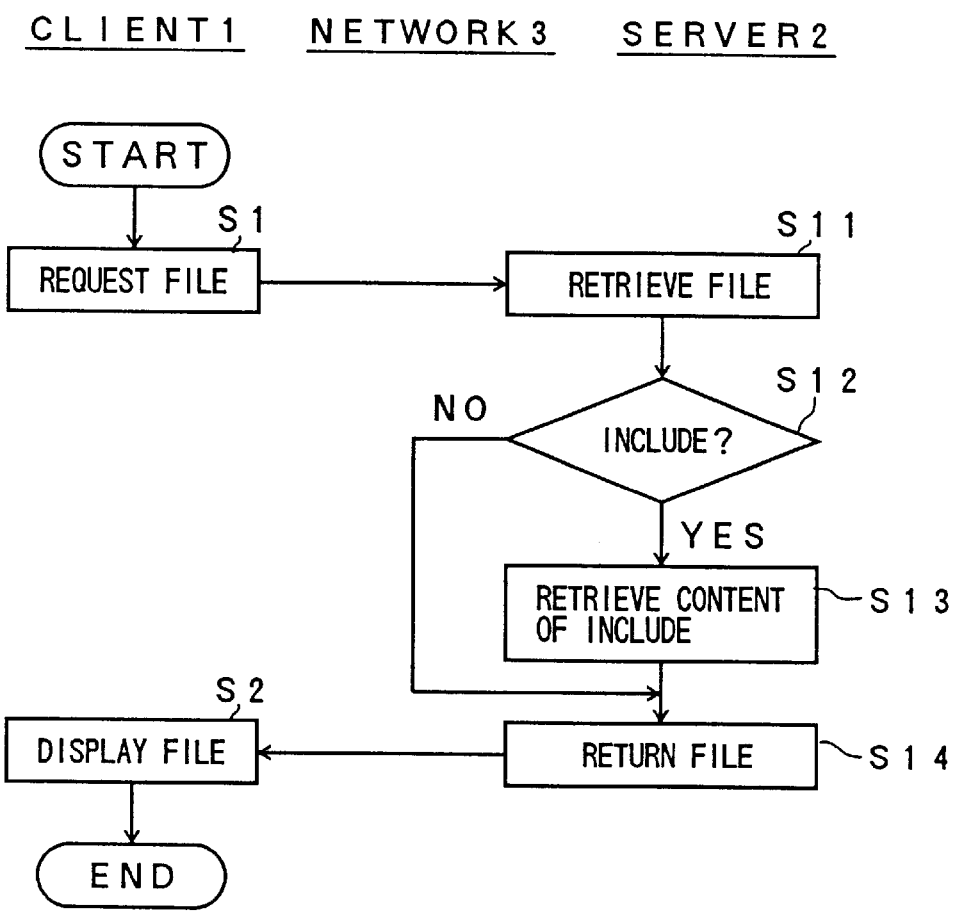
FIG. 7 is a flow chart for explaining a process of the first embodiment.

FIG. 7 is a flow chart for explaining a process of the first embodiment. In a step S1 shown in FIG. 7, the browser installed at the client 1 requests an index file with respect to server 2 by URL, for example.

In a step S11, the server 2 retrieves the index file requested from the client 1. When the requested index file is retrieved, a step S12 decides in the server 2 whether or not an include statement is written in the retrieved index file. If the decision result in the step S12 is NO, the process advances to a step S14 which will be described later. On the other hand, if the decision result in the step S12 is YES, the server 2 retrieves a file specified by the include statement in a step S13. In the step S14, the server 2 includes the file which is specified by the include statement and is retrieved in the step S13 into the index file retrieved in the step S11, and returns the index file to the client 1 at the request source.

In a step S2 the client 1 displays the index file returned from the server 2 on the display unit. If the browser installed at the client 1 supports the frame function, the step S2 displays the index file in the frame format. On the other hand, if the browser installed at the client 1 does not support the frame structure, the step S2 displays the index file in the non-frame format.

In this particular embodiment, the browser installed at the client 1 does not support the frame function, and each table of contents, that is, window3.html, is specified by the include statement. For this reason, when displaying the index file index.html returned from the server 2 on the display unit of the client 1, each table of contents including the simplified text main menu included in the non-frame tag part of the index file index.html, that is, the content of window3.html between <noframes> and </noframes>, is displayed in the non-frame format.

Next, a description will be given of a second embodiment of the file management method according to the present invention. This second embodiment of the file management method employs a second embodiment of the file display method according to the present invention. In this embodiment, it is also assumed for the sake of convenience that the file structure of the file having the frame structure is identical to that shown in FIG. 1A described above.

Figure 8:
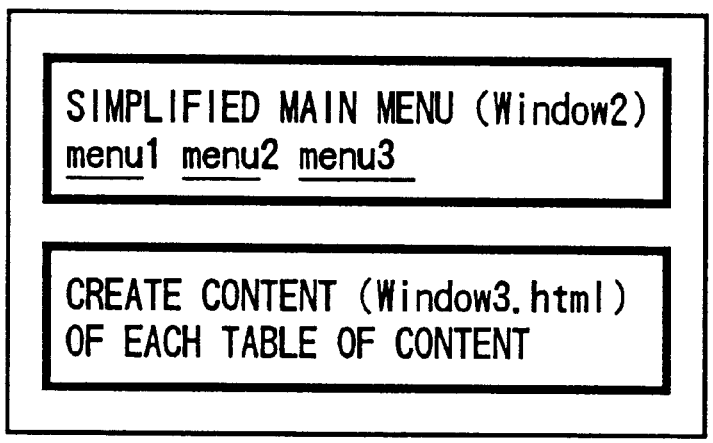
FIG. 8 is a diagram showing file contents of window3.html of a second embodiment of the present invention.
Figure 10:
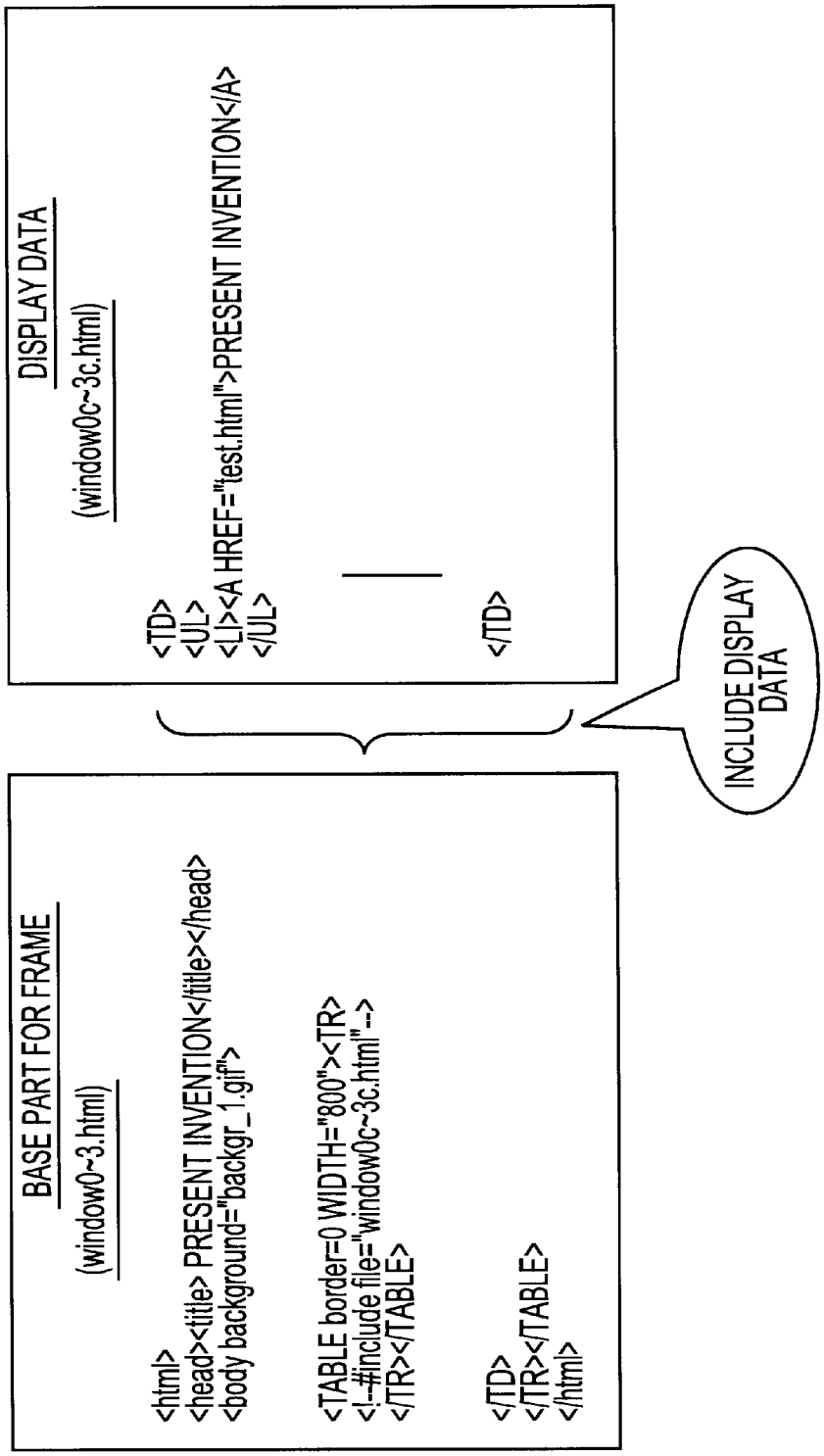
FIG. 10 is a diagram showing the contents of a display file of a frame in the second embodiment.

In this embodiment, a simplified text main menu shown in FIG. 8 is provided with respect to each table of contents, that is, window3.html. On the other hand, with respect to each of window0.html through window2.html, window3 is specified as a base target as shown in FIG. 9 and the target of each link part is not specified. In addition, a display file of the frame is divided into base parts window0.html through window3.html related to a frame structure of the window, and display parts window0c.html through window3c.html related to the content of the window, as shown in FIG. 10.

The index file index.html is created by using window1.html through window3.html in the case of the frame structure, as shown in FIG. 11. On the other hand, in the case of the non-frame structure, the index file index.html is created by including the base parts window0.html through window3.html to the display parts window0c.html through window3c.html between <TD> and </TD>, as shown in FIG. 11.

Accordingly, when the client 1 requests the file with respect to the server 2 by URL, for example, in the case where the browser installed at the client 1 does not support the frame function, the server 2 returns the index file index.html of the specified URL to the client 1 via the network 3. In this case, if the include statement <!—#include . . . > is written in the index file index.html, the file specified by the include statement is included in the index file index.html and this index file is returned to the client 1. In this particular embodiment, the base parts window0.html through window3.html and the display parts window0c.html through window3c.html are specified, and thus, the server 2 includes each table of contents including the simplified text main menu shown in FIG. 8, window0.html through window3.html shown in FIG. 9, and the base parts window0.html through window3.html and the display parts window0c.html through window3c.html shown in FIG. 10 in the index file index.html, and returns this index file index.html to the client 1 at the request source.

The client 1 at the request source displays the index file index.html returned from the server 2 on the display unit. In this case, each table of contents including the simplified text main menu included in the non-frame tag part of the index file index.html, that is, the content of the base parts window0.html through window3.html and the display parts window0c.html through window3c.html between <noframes> and </noframes>, is displayed in the non-frame format. A layout of the displayed result displayed in the non-frame format becomes essentially the same as the layout of the displayed result displayed in the frame format shown in FIG. 1A.

Therefore, this embodiment creates the display file of the frame which is divided into window3.html shown in FIG. 8 provided with the simplified text main menu and the base parts window0.html through window3.html and the display parts window0c.html through window3c.html shown in FIG. 10. In other words, the file window3.html, with the simplified text main menu, is formed by window3.html and window3c.html. For this reason, it is unnecessary to create the same main menu and the same table of contents independently with respect to the HTML file having the frame structure and the HTML file having the non-frame structure, in order to enable reading of the home page by both the browser which supports the frame function and the browser which does not support the frame function. As a result, there is no need to manage two kinds of HTML files, and the file management is simplified. Furthermore, the home page which is read by the browser can be displayed with essentially the same layout regardless of whether the browser supports the frame function or the browser does not support the frame function.

A flow chart of a process carried out in this second embodiment is essentially the same as that of the first embodiment shown in FIG. 7, and an illustration and description thereof will be omitted.

Next, a description will be given of a third embodiment of the file management method according to the present invention. This third embodiment of the file management method employs a third embodiment of the file display method according to the present invention. In this embodiment, it is also assumed for the sake of convenience that the file structure of the file having the frame structure is identical to that shown in FIG. 1A described above.

In this embodiment, when displaying a requested index file at the client 1, it is possible to switch the display between a frame format and a non-frame format depending on the resolution, size and the like of the screen of the display unit, even if the browser used supports the frame function. The structure of the index file and the like managed at the server 2 is the same as that of the first and second embodiments described above.

FIG. 12 is a flow chart for explaining a process of the third embodiment. In FIG. 12, those steps which are the same as those corresponding steps in FIG. 7 are designated by the same reference numerals, and a description thereof will be omitted.

At the client 1, a step S3 decides whether or not a display is to be made in the frame format when displaying the index file returned from the server 2 on the screen of the display unit of the client 1. In this embodiment, the browser used supports the frame function. However, it is possible to switch the display between the frame format and the non-frame format depending on the resolution, size and the like of the screen of the display unit. If the decision result in the step S3 is YES, the process advances to a step S2-1. On the other hand, if the user at the client 1 instructs the display in the non-frame format, for example, and the decision result in the step S3 is NO, a step S4 switches the data supplied to the display unit from the frame structure part of the index file to the non-frame structure part of the index file, before the process advances to the step S2-1. Accordingly, the step S2-1 displays the index file in the frame format if the decision result in the step S3 is YES, and displays the index file in the non-frame format if the decision result in the step S3 is NO.

In addition to the effects obtainable in the first or second embodiment described above, this embodiment has the following additional effects. That is, even if the browser installed at the client 1 supports the frame function, there are cases where the display in the frame format may instead be less easily recognized by the user depending on the resolution, size and the like of the screen of the display unit of the client 1. In such cases, this embodiment can arbitrarily switch the display of the index file from the frame format to the non-frame format.

Figure 1A:
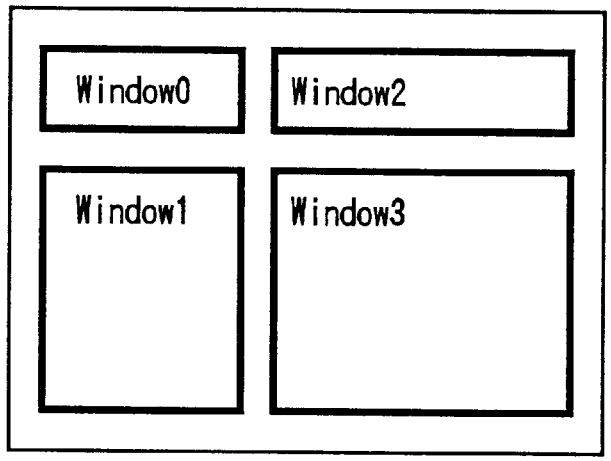
FIGS. 1A and 1B respectively are diagrams for explaining conventional files having a frame structure and a non-frame structure.
Figure 1B:
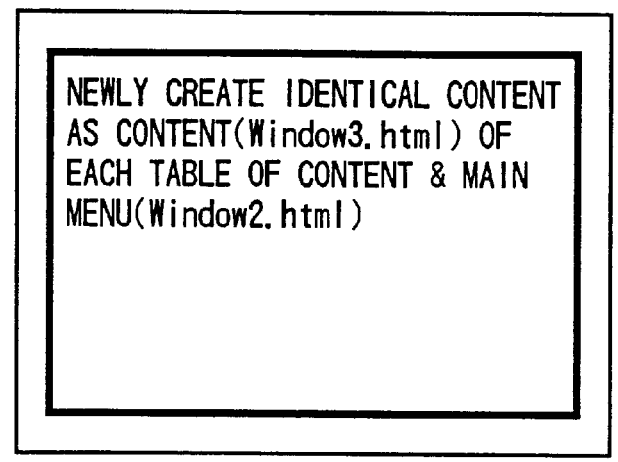
Figure 13:
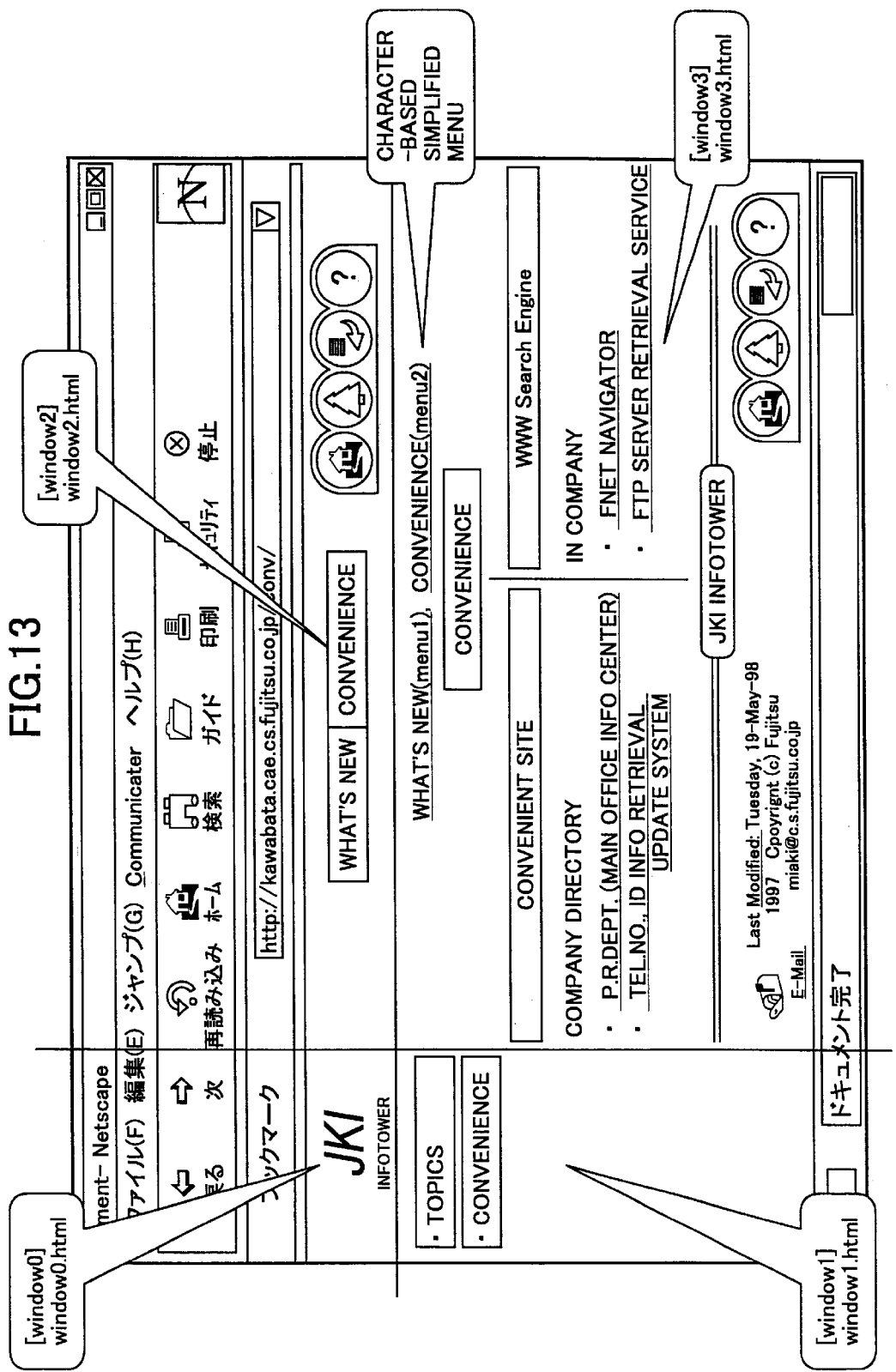
FIG. 13 is a diagram showing the display contents in a case where an embodiment of an index file having a frame structure is displayed in the frame format.

FIG. 13 is a diagram showing the display contents in a case where an embodiment of the index file having the frame structure is displayed in the frame format. In FIG. 13, those parts which are the same as those corresponding parts in FIG. 1A are designated by the same reference numerals, and a description thereof will be omitted.

Figure 14:
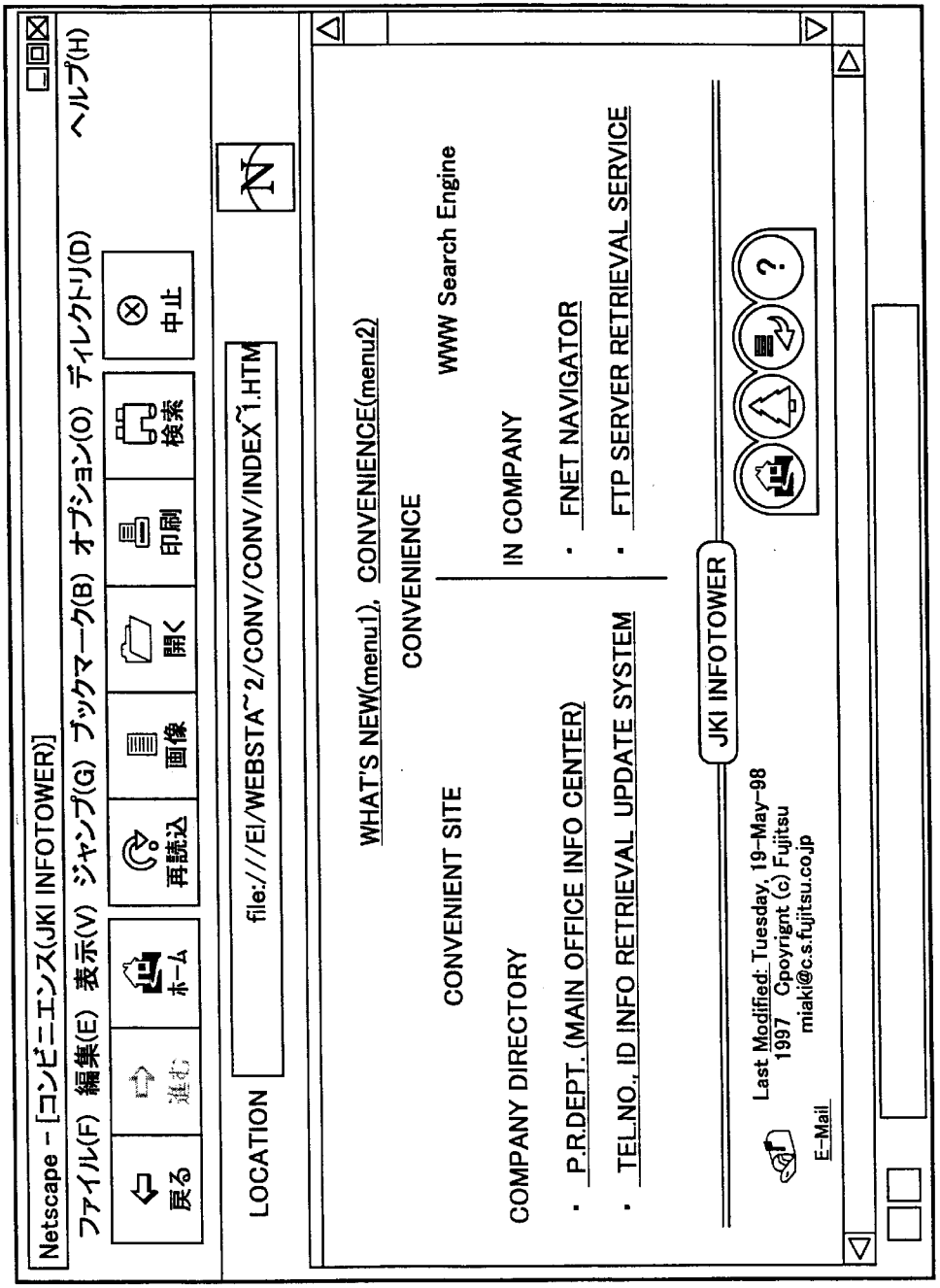
FIG. 14 is a diagram showing the display contents in a case where the index file shown in FIG. 13 is displayed in a non-frame format by the first embodiment of the method.

FIG. 14 is a diagram showing the display contents in a case where the index file shown in FIG. 13 is displayed in a non-frame format by the first embodiment of the method.

Figure 15:
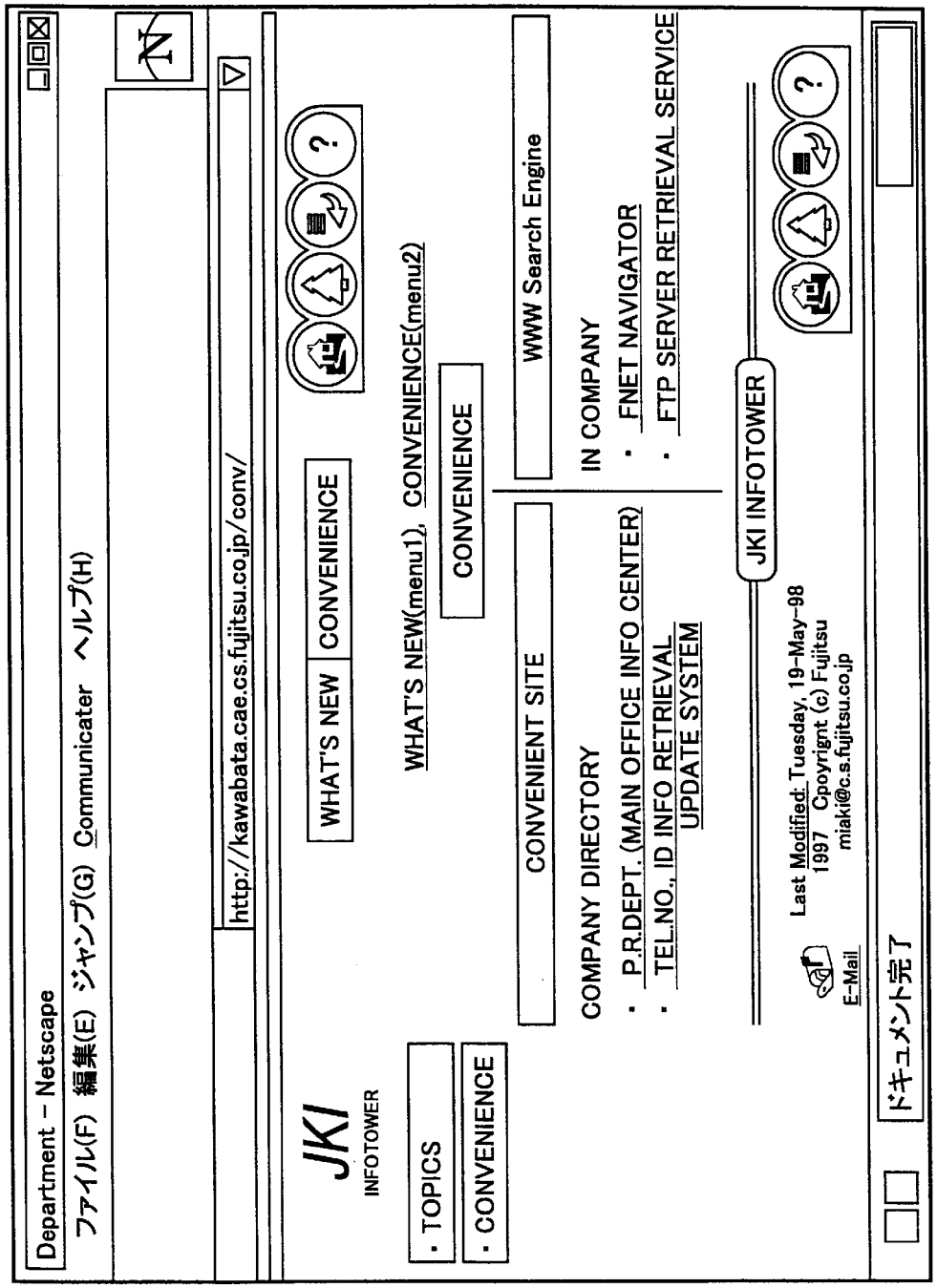
FIG. 15 is a diagram showing the display contents in a case where the index file shown in FIG. 13 is displayed in the non-frame format by the second embodiment of the method.

FIG. 15 is a diagram showing the display contents in a case where the index file shown in FIG. 13 is displayed in the non-frame format by the second embodiment of the method.

FIG. 16 is a diagram showing a list of an embodiment of window0.html in each of the embodiments. FIG. 17 is a diagram showing a list of an embodiment of window1.html in each of the embodiments. FIG. 18 is a diagram showing a part of a list of an embodiment of window2.html in each of the embodiments, and FIG. 19 is a diagram showing a remaining part of the list of the embodiment of window2.html in each of the embodiments. FIG. 20 is a diagram showing a list of a part of an embodiment of window3.html in each of the embodiments, and FIG. 21 is a diagram showing a list of a remaining part of the embodiment of window3.html in each of the embodiments. FIG. 22 is a diagram showing a part of an embodiment of the index file index.html which is returned from the server 2 to the client 1 in each of the embodiments, FIG. 23 is a diagram showing another part of the embodiment of the index file index.html which is returned from the server 2 to the client 1 in each of the embodiments, and FIG. 24 is a diagram showing a remaining part of the embodiment of the index file index.html which is returned from the server 2 to the client 1 in each of the embodiments.

Figure 25:
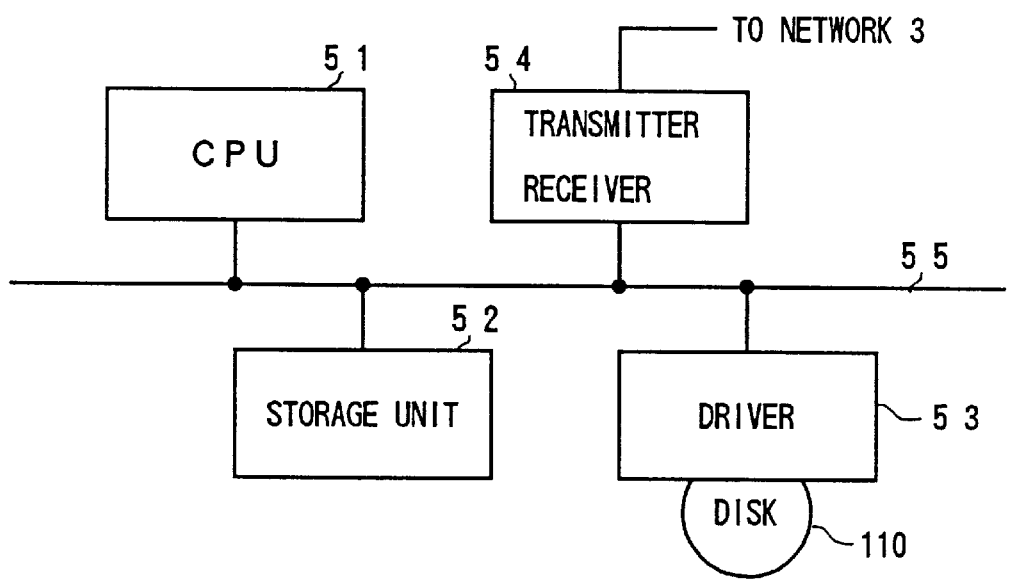
FIG. 25 is a system block diagram showing the structure of an important part of the server.

Next, a description will be given of a first embodiment of a storage medium according to the present invention, by referring to FIG. 25. FIG. 25 is a system block diagram showing the structure of an important part of the server 2.

In FIG. 25, the server 2 generally includes a CPU 51, a storage unit 52, a driver 53 and a transmitter/receiver 54 which are coupled by a bus 55. The CPU 51 is made of a known processor unit and controls the entire operation of the server 2. The storage unit 52 stores programs to be executed by the CPU 51, intermediate data obtained during computations carried out by the CPU 51, and various other data. The driver 53 has a known construction for writing data to and/or reading data from a disk 110 which is loaded with respect to the driver 53. For example, the program which is executed by the CPU 51 may be read from the disk 110 by the driver 53 and stored in the storage unit 52. The transmitter/receiver 54 is coupled to the network 3, and has a known construction for receiving data from and transmitting data to the network 3.

This first embodiment of the storage medium is formed by a recording medium, such as the disk 110 which stores a program for causing a computer such as the CPU 51 to carry out the first or second embodiment of the file management method described above. The recording medium may be any type of medium capable of storing information, such as an IC card memory, floppy disk, magneto-optic disk, CD-ROM, and various semiconductor memory devices. In addition, the recording medium is not limited to a medium which is portable or removable with respect to the computer. Furthermore, the recording medium may be a medium accessible from a computer system via a communication unit or a communication means such as a modem and a LAN.

Figure 26:
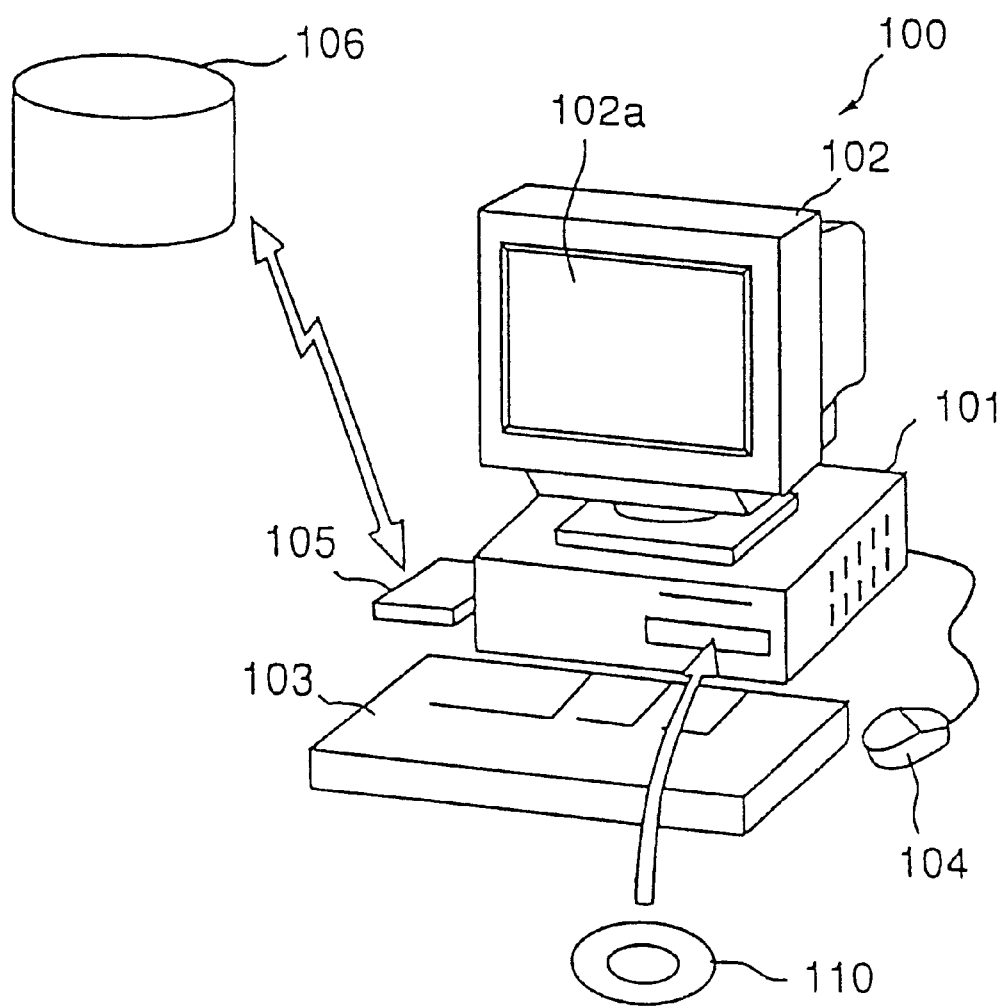
FIG. 26 is a perspective view showing a computer system which realizes the file display method according to the present invention.

Next, a description will be given of a second embodiment of the storage medium according to the present invention, by referring to FIG. 26. FIG. 26 is a perspective view showing a computer system which realizes the file display method according to the present invention.

A computer system 100 shown in FIG. 26 is made up of a general computer system such as a personal computer. The computer system 100 generally includes a main body 101, a display unit 102, a keyboard 103, a mouse 104 and a modem 105. The main body 101 includes a CPU, a disk drive and the like. The display unit 102 includes a display screen 102a which displays an image based on an instruction from the main body 101. The keyboard 103 is used to input various information to the computer system 100. The mouse 104 is used to specify an arbitrary position on the display screen 102a of the display unit 102. The modem 105 is used to make an access to an external database and the like, and to download a program or the like stored in another computer system. The program which is stored in a portable recording medium such as the disk 110 or is downloaded from a recording medium 106 of another computer system using the communication unit such as the modem 105 is input to the computer system 100 and compiled. This program includes a program for causing the CPU of the computer system 100 to display a file according to one of the first through third embodiments of the file display method described above.

This embodiment of the storage medium is formed by a recording medium such as the disk 110 which stores a program for causing a computer such as the CPU 51 to carry out the first or second embodiment of the file management method described above. The recording medium may be any type of medium capable of storing information, such as an IC card memory, floppy disk, magneto-optic disk, CD-ROM, and various semiconductor memory devices. In addition, the recording medium is not limited to a medium which is portable or removable with respect to the computer. Furthermore, the recording medium may be a medium accessible from a computer system via a communication unit or a communication means such as a modem and a LAN.

The construction of an important part within the main body 101 of the computer system 100 may be the same as that of the important part of the server 2 shown in FIG. 25, and an illustration and description thereof will be omitted.

Of course, the construction of the computer system 100 is not limited to that shown in FIG. 26, and it is possible to use computer systems having various other known constructions to realize the present invention.

Further, the present invention is not limited to these embodiments, but various variations and modifications may be made without departing from the scope of the present invention.

What is claimed is:

1. A file management method for displaying an index file having a frame structure made up of a plurality of windows by a browser that does not support a frame function, each of the plurality of windows corresponding to a file, comprising:

specifying at least one specific window within the index file from the plurality of windows as a base target; and
including at least one file corresponding to the base target in a non-frame tag part of the index file.

2. The file management method as claimed in claim 1, wherein the contents of said specific window include a simplified text main menu.

3. The file management method as claimed in claim 2, further comprising:

dividing a display file of a frame of the index file into base parts related to frame structures of the windows and display parts related to contents of the windows.

4. The file management method as claimed in claim 1, further comprising:

dividing a display file of a frame of the index file into base parts related to frame structures of the windows and display parts related to contents of the windows.

5. A file display method for displaying a index file having a frame structure made up of a plurality of windows by a browser that does not support a frame function, each of the plurality of windows corresponding to a file, wherein at least one specific window within the index file from the plurality of windows is specified as a base target, the file display method comprising:

reading at least one file corresponding to the base target by a non-frame tag part of the index file using an include function, and displaying the contents of the base target in non-frame format.

6. The file display method as claimed in claim 5, wherein the contents of said specific window include a simplified text main menu.

7. The file display method as claimed in claim 6, wherein:

a display file of a frame of the index file is divided into base parts related to frame structures of the windows and display parts related to contents of the windows; and said reading and displaying reads the base parts and the display parts using the include function and displays the index file in a non-frame format with a layout essentially identical to that of a frame format.

8. The file display method as claimed in claim 5, wherein:

a display file of a frame of the index file is divided into base parts related to frame structures of the windows and display parts related to contents of the windows; and said reading and displaying reads the base parts and the display parts using the include function and displays the index file in a non-frame format with a layout essentially identical to that of a frame format.

9. A file display method for displaying an index file having a frame structure made up of a plurality of windows by a browser that supports a frame function, each of the plurality of windows corresponding to a file, wherein at least one specific window within the index file from the plurality of windows is specified as a base target, said file display method comprising:

reading at least one file corresponding to the base target by a non-frame tag part of the index file using an include function; and arbitrarily switching a display to display the contents of the base target in a non-frame format or to display the index file in the frame format.

10. A computer-readable storage medium that stores a program for causing a computer to manage files by displaying an index file having a frame structure made up of a plurality of windows by a browser that does not support a frame function, each of the plurality of windows corresponding to a file, comprising:

means for causing the computer to specify at least one specific window within the index file from the plurality of windows as a base target; and means for causing the computer to include at least one file corresponding to the base target in a non-frame tag part of the index file.

11. The computer-readable storage medium as claimed in claim 10, wherein the contents of said specific window include a simplified text main menu.

12. The computer-readable storage medium as claimed in claim 11, which further comprises:

means for causing the computer to divide a display file of a frame of the index file into base parts related to frame structures of the windows and display parts related to contents of the windows.

13. The computer-readable storage medium as claimed in claim 10, which further comprises:

means for causing the computer to divide a display file of a frame of the index file into base parts related to frame structures of the windows and display parts related to contents of the windows.

14. A computer-readable storage medium that stores a program for causing a computer to display an index file having a frame structure made up of a plurality of windows by a browser that does not support a frame function, each of the plurality of windows corresponding to a file, wherein at least one specific window within the index file from the plurality of windows is specified as a base target, the computer-readable storage medium comprising:

means for causing the computer to read at least one file corresponding to the base target by a non-frame tag part of the index file using an include function, and to display the contents of the base target in a non-frame format.

15. The computer-readable storage medium as claimed in claim 14, wherein the contents of said specific window include a simplified text main menu.

16. The computer-readable storage medium as claimed in claim 15, wherein:

a display file of a frame of the index file is divided into base parts related to frame structures of the windows and display parts related to contents of the windows; and said means causes the computer to read the base parts and the display parts using the include function and display the index file in a non-frame format with a layout essentially identical to that of a frame format.

17. The computer-readable storage medium as claimed in claim 14, wherein:

a display file of a frame of the index file is divided into base parts related to frame structures of the windows and display parts related to contents of the windows; and said means causes the computer to read the base parts and the display parts using the include function and display the index file in a non-frame format with a layout essentially identical to that of a frame format.

18. A computer-readable storage medium that stores a program for causing a computer to display an index file having a frame structure made up of a plurality of windows by a browser that supports a frame function, each of the plurality of windows corresponding to a file, wherein at least one specific window within the index file has a frame structure made up of a plurality of windows by a browser that supports a frame function, wherein at least one specific window within the index file from the plurality of windows is specified as a base target, the computer-readable storage medium comprising:

means for causing the computer to read at least one file corresponding to the base target by a non-frame tag part of the index file using an include function; and means for causing the computer to arbitrarily switch a display to display the contents of the base target in a non-frame format or to display the index file in the frame format.

* * * * *